United States Patent
Xiao et al.

(10) Patent No.: US 10,634,987 B1
(45) Date of Patent: Apr. 28, 2020

(54) CONVEX MULTI-PROJECTOR LIGHT-FIELD DISPLAY SYSTEM

(71) Applicants: National Taiwan University, Taipei (TW); Himax Technologies Limited, Tainan (TW)

(72) Inventors: Yi Teng Xiao, Taipei (TW); Hoang Yan Lin, Taipei (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 0 days.

(21) Appl. No.: 16/405,840

(22) Filed: May 7, 2019

(51) Int. Cl.
| | |
|---|---|
| *G03B 21/60* | (2014.01) |
| *H04N 13/246* | (2018.01) |
| *H04N 13/363* | (2018.01) |
| *G06T 3/00* | (2006.01) |
| *G03B 21/58* | (2014.01) |
| *G03B 21/625* | (2014.01) |
| *G03B 21/62* | (2014.01) |
| *G03B 21/56* | (2006.01) |

(52) U.S. Cl.
CPC .............. *G03B 21/60* (2013.01); *G03B 21/56* (2013.01); *G03B 21/58* (2013.01); *G03B 21/62* (2013.01); *G03B 21/625* (2013.01); *G06T 3/005* (2013.01); *H04N 13/246* (2018.05); *H04N 13/363* (2018.05)

(58) Field of Classification Search
CPC ........ G03B 21/56; G03B 21/60; G03B 21/58; G03B 21/625; G03B 21/62
USPC .......................................................... 359/443
See application file for complete search history.

(56) References Cited

U.S. PATENT DOCUMENTS

| | | | | |
|---|---|---|---|---|
| 2,280,206 A | * | 4/1942 | Waller | G03B 37/00 352/36 |
| 2,365,010 A | * | 12/1944 | Rogers | G03B 21/606 428/426 |
| 2,953,964 A | * | 9/1960 | Dresser | G03B 37/00 352/71 |
| 3,144,806 A | * | 8/1964 | Smith | G03B 37/00 352/70 |

(Continued)

FOREIGN PATENT DOCUMENTS

WO    WO-2007149333 A2 * 12/2007 ............. G03B 21/56

OTHER PUBLICATIONS

Yi Teng Xiao et al., Optimization of Multi-Projector Light-Field Display Based on Convex Display Properties, SID 2018 Digest 1531, 2018, 3 pags (Year: 2018).*

(Continued)

*Primary Examiner* — Clayton E. LaBalle
*Assistant Examiner* — Kevin C Butler
(74) *Attorney, Agent, or Firm* — Donald E. Stout; Stout, Uxa & Buyan, LLP (57) ABSTRACT

A convex multi-projector light-field display system includes projectors and a convex diffusion screen facing the projectors. The convex diffusion screen and the plurality of projectors share a same center of curvature, such that each projector projects the image at normal incidence to the convex diffusion screen. Projections of the projectors overlap in an optimal viewing area, within which an observer sees images projected by the projectors, and the optimal viewing area and the plurality of projectors are disposed on opposite sides of the convex diffusion screen.

17 Claims, 6 Drawing Sheets

(56) References Cited

U.S. PATENT DOCUMENTS

| | | | | |
|---|---|---|---|---|
| 3,237,517 | A * | 3/1966 | Komitor | G03B 21/56 359/451 |
| 3,630,604 | A * | 12/1971 | Miller | G02B 17/0812 353/99 |
| 4,022,522 | A * | 5/1977 | Rain | G03B 21/56 359/443 |
| 4,089,597 | A * | 5/1978 | Collender | G03B 35/00 352/133 |
| 4,547,050 | A * | 10/1985 | Collender | G03B 35/00 352/43 |
| 4,657,512 | A * | 4/1987 | Mecklenborg | G09B 9/326 348/58 |
| 5,175,575 | A * | 12/1992 | Gersuk | G03B 21/56 352/69 |
| 5,253,116 | A * | 10/1993 | Lacroix | G09B 9/326 359/471 |
| 5,414,558 | A * | 5/1995 | You | G03B 21/60 359/443 |
| 5,601,353 | A * | 2/1997 | Naimark | G03B 21/00 348/36 |
| 5,638,208 | A * | 6/1997 | Walker | G03B 21/56 359/443 |
| 6,201,516 | B1 * | 3/2001 | Tanide | A63J 25/00 345/7 |
| 6,347,012 | B1 * | 2/2002 | Monson | G02B 3/08 359/451 |
| 6,813,074 | B2 * | 11/2004 | Starkweather | G03B 21/62 348/389.1 |
| 6,909,543 | B2 * | 6/2005 | Lantz | G03B 21/00 348/36 |
| 7,180,663 | B2 * | 2/2007 | Collender | G03B 25/00 359/451 |
| 7,227,683 | B2 * | 6/2007 | Choi | G03B 21/56 359/443 |
| 8,016,426 | B2 * | 9/2011 | Artonne | G03B 21/142 353/122 |
| 10,423,059 | B2 * | 9/2019 | Nashida | G03B 21/562 |
| 2002/0122249 | A1 * | 9/2002 | Kobayashi | G03B 21/56 359/443 |
| 2002/0196538 | A1 * | 12/2002 | Lantz | H04N 9/3141 359/443 |
| 2007/0103776 | A1 * | 5/2007 | Cok | G03B 21/56 359/451 |
| 2009/0059126 | A1 * | 3/2009 | Koganezawa | G02F 1/133611 349/64 |
| 2012/0105805 | A1 * | 5/2012 | Kuo | G02B 27/2214 353/7 |
| 2016/0054648 | A1 * | 2/2016 | Read | G03B 21/606 353/8 |
| 2016/0333597 | A1 * | 11/2016 | de Lespinois | E04B 1/346 |
| 2018/0356718 | A1 * | 12/2018 | Nashida | G03B 21/562 |

OTHER PUBLICATIONS

A. Jones, et al., "Rendering for an Interactive 360° Light Field Display", ACM Transactions on Graphics (TOG)—Proc. of ACM SIGGRAPH 26(3), Article No. 40, Jul. 2007 (Year: 2007).*
Chun-Chia Hsu*, Shih-Yu Tu, Image quality evaluation of laser projection light field 3D display, SID(2016) (Year: 2016).*
Kyaw Kyaw Aung, Optimization of Image Quality for the Scalable Laser-Projection Light Field 3D Display, SID(2017) (Year: 2017).*
Gregg E. Favalora, Volumetric 3D Displays and Application Infrastructure, IEEE Computer Society, Aug. 2005, 8 pgs (Year: 2005).*
Tibor et al, A Large Scale Intereactive Holographic Display, IEEE VR 2006 Workshop on Emerging Display Technologies, Mar. 26, 2006, 2pgs (Year: 2006).*
Chris Slinger et al, Computer-Generated Holography as a Generic Display Technology, IEEE Computer Society, 2005, 8 pgs (Year: 2005).*
Jason Geng, Three-Dimensional Display Technologies, Optical Society of America, Dec. 17, 2014, 123 pgs (Year: 2014).*
Andrew Jones et al., Interpolating vertical parallax for an autostereoscopic three-dimensional projector array, Journal of Electronic Imaging, Jan.-Feb. 2014, 13 pages (Year: 2014).*
Jeroen van Baar, Seamless Multi-Projector Display on Curved Screens, Mitsubishi Electric Research Laboratories, Inc., 2003, 8 pgs (Year: 2003).*
Jason Geng, Design of a single projector multview 3D display system, Proc. of SPIE vol. 8979, 2014, 15 pages (Year: 2014).*

* cited by examiner

| $d_1$ (or 2R) | r | $d_2$ range (min-max) |
|---|---|---|
| 400mm | 289.27mm | 200-778mm |
| 500mm | 347.12mm | 200-894mm |
| 600mm | 404.94mm | 200-1000mm |
| 700mm | 462.83mm | 200-1125mm |

CONVEX MULTI-PROJECTOR LIGHT-FIELD DISPLAY SYSTEM

BACKGROUND OF THE INVENTION

1. Field of the Invention

The present invention generally relates to a light-field display, and more particularly to a convex multi-projector light-field display system.

2. Description of Related Art

An autostereoscopic display can provide a stereoscopic image without the use of special viewing glasses on the part of the viewer, and is also called glasses-free three-dimensional (3D) display. Instead of showing on two-dimensional (2D) displays, the autostereoscopic display allows the viewer to be situated anywhere around it. Recently, the study of autostereoscopic display is becoming increasingly popular due to recent advances in digital capture and computation, which make the 3D display possible.

The technology of autostereoscopic display can be applied to a number of areas. In particular, the light-field display, as being one type of the autostereoscopic display, can provide a true 3D image with smooth motion parallax and has attracted a lot of interests.

Crosstalk and image distortion are issues commonly addressed in the conventional light-field displays such as planar light-field displays. In addition, a light-field display with a large viewing angle and capable of providing a panoramic view for multiple views has been sought. Therefore, a need has arisen to propose a novel light-field display with larger viewing angles and less image distortion than the conventional light-field displays.

SUMMARY OF THE INVENTION

In view of the foregoing, it is an object of the embodiment of the present invention to provide a convex multi-projector light-field display system with larger viewing angles and decreased image distortion.

According to one embodiment, a convex multi-projector light-field display system includes projectors and a convex diffusion screen. The projectors are disposed approximately on a periphery of a first circle with first radius. The convex diffusion screen is disposed approximately on the periphery of the first circle and faces the projectors. Projections of the projectors overlap in a second circle with second radius as being an optimal viewing area, within which an observer sees images projected by the projectors, and the second circle and the first circle are disposed on opposite sides of the convex diffusion screen.

DETAILED DESCRIPTION OF THE INVENTION

Figure 1:
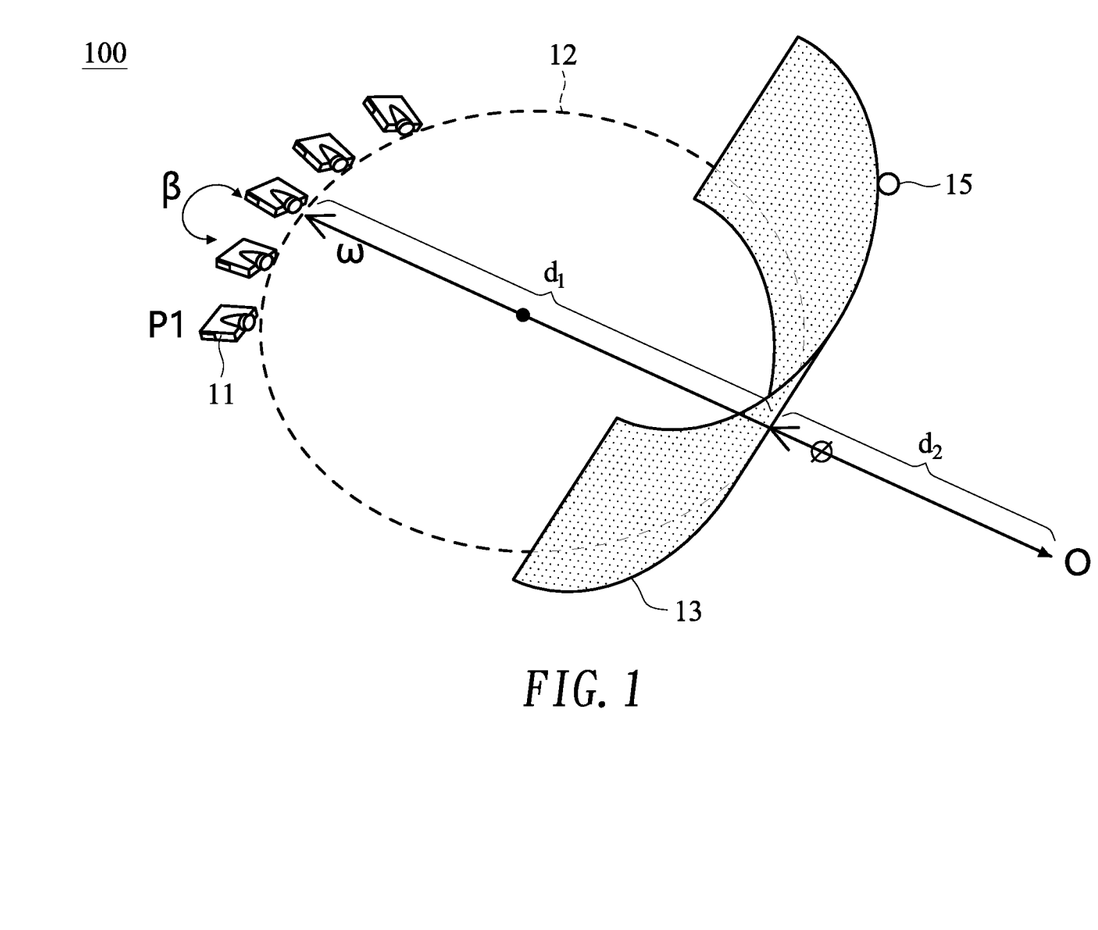
FIG. 1 shows a perspective view illustrating a convex multi-projector light-field display system according to one embodiment of the present invention.
Figure 2:
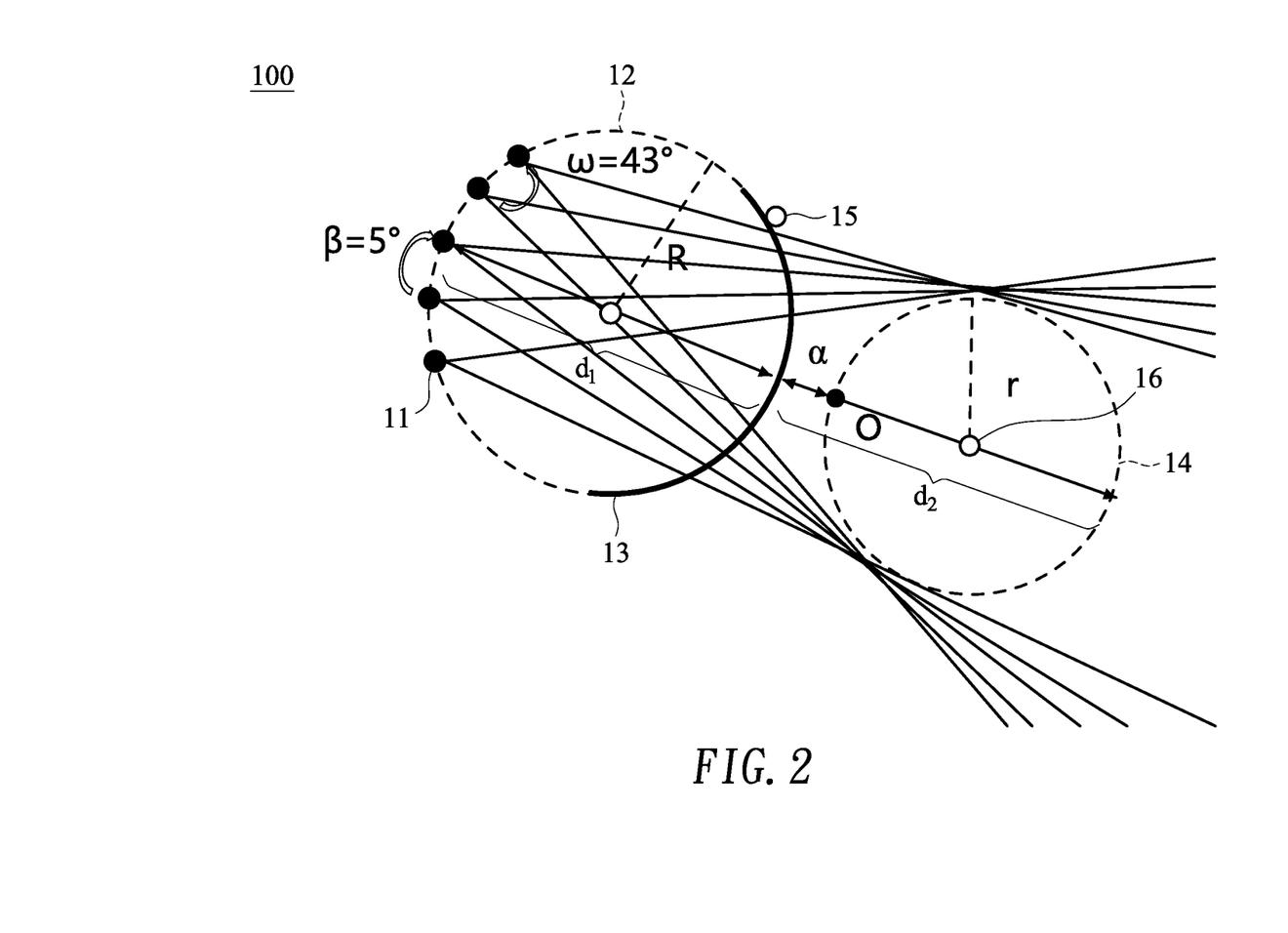
FIG. 2 schematically shows a top view of the convex multi-projector light-field display system of FIG. 1.

FIG. 1 shows a perspective view illustrating a convex multi-projector light-field display system 100 according to one embodiment of the present invention, and FIG. 2 schematically shows a top view of the convex multi-projector light-field display system (display system hereinafter) 100 of FIG. 1.

In the embodiment, the display system 100 may include a plurality of projectors 11 disposed approximately on a periphery of a (first) circle (or circular area) 12 with (first) radius R. In one embodiment, the display system 100 includes five projectors 11, such as microelectromechanical systems (MEMS) laser projectors, being separated by an angle β (e.g., 5°), and each having a projection angle ω (e.g., 43°).

The display system 100 of the embodiment may include a convex diffusion screen 13, such as an optical diffuser, disposed approximately on the periphery of the (first) circle 12 and facing (or positioned opposite) the projectors 11. Accordingly, projector-screen distance $d_1$ between the projector 11 and the convex diffusion screen 13 is equal to 2R. In one embodiment, the convex diffusion screen 13 has a width large enough to cover light projected from the projectors 11. Light from each projector 11 may be scattered by the convex diffusion screen 13 at a scattering angle ø (e.g., 5°), and finally an entire 3D image projected by all the projectors 11 may be superimposed with each projector 11 responsible for displaying different sub-scenes.

As shown in FIG. 2, the projection of the projectors 11 may overlap in a (second) circle (or circular area) 14 with (second) radius r, which is an optimal viewing area, within which an observer (or viewer) O can see the images supplied by the projectors 11. It is noted that the second circle 14 and the first circle 12 are disposed on opposite sides of the convex diffusion screen 13. Accordingly, screen-observer distance $d_2$ between the convex diffusion screen 13 and the observer O has a range between α and α+2r, where α is minimum (viewing) distance between the first circle 12 and the second circle 14. It is noted that, the wider the convex diffusion screen 13 is, the larger the minimum (viewing) distance α is. In one embodiment, relationship among the radius R, the radius r, the projection angle ω and the minimum viewing distance α may be expressed as $$r = \frac{(2R+\alpha)}{(1-\sin\frac{\omega}{2})} * \sin\frac{\omega}{2}$$

Figure 3:
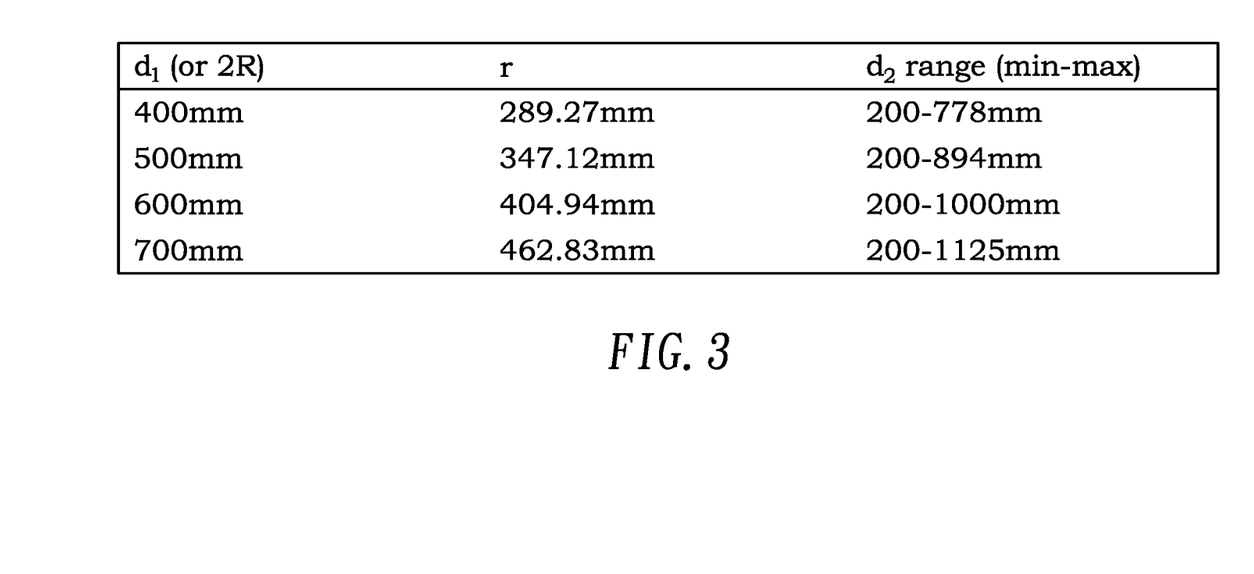
FIG. 3 shows a table exemplifying some sets of the projector-screen distance $d_1$, the radius r and the screen-observer distance $d_2$.

FIG. 3 shows a table exemplifying some sets of the projector-screen distance $d_1$ (i.e., 2R), the radius r and the screen-observer (or viewing) distance $d_2$ with the minimum viewing distance α of 200 mm.

In regard to the image distortion caused by overlapping and crosstalk of the neighboring images (from the projectors 11), we analyze the view of the ideal correct image (CD) and the actual projected image (AD). By measuring the position of each pixel, the average distortion can be obtained by $$\text{Distortion} = \frac{AD - CD}{CD} * 100\%$$

Figure 4:
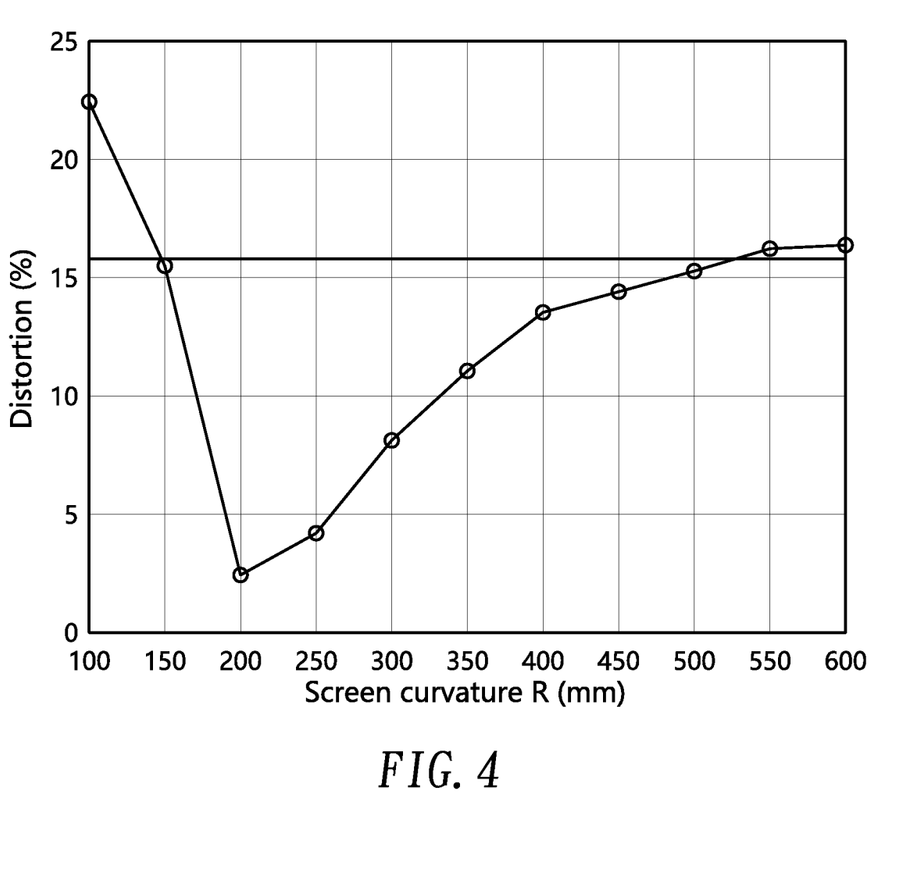
FIG. 4 shows relationship between the distortion and the radius R of screen curvature of the convex diffusion screen.

FIG. 4 shows relationship between the distortion and the radius R of screen curvature (abbreviated as screen curvature R hereinafter) of the convex diffusion screen 13. With R being at around the 200 mm, the image exhibits the smallest distortion. We observe that at this point, the projectors 11 and the convex diffusion screen 13 share the same center of curvature, such that each projector 11 projects the image at normal incidence to the convex diffusion screen 13 and the smallest degree of distortion is observed. The distortion can be observed to increase as R continues to rise beyond 200 mm. It is noted that the distortion at R of 550 mm is very similar to that of a planar display designated by the horizontal line, since the curvature is close to that of a planar display.

Figure 5:
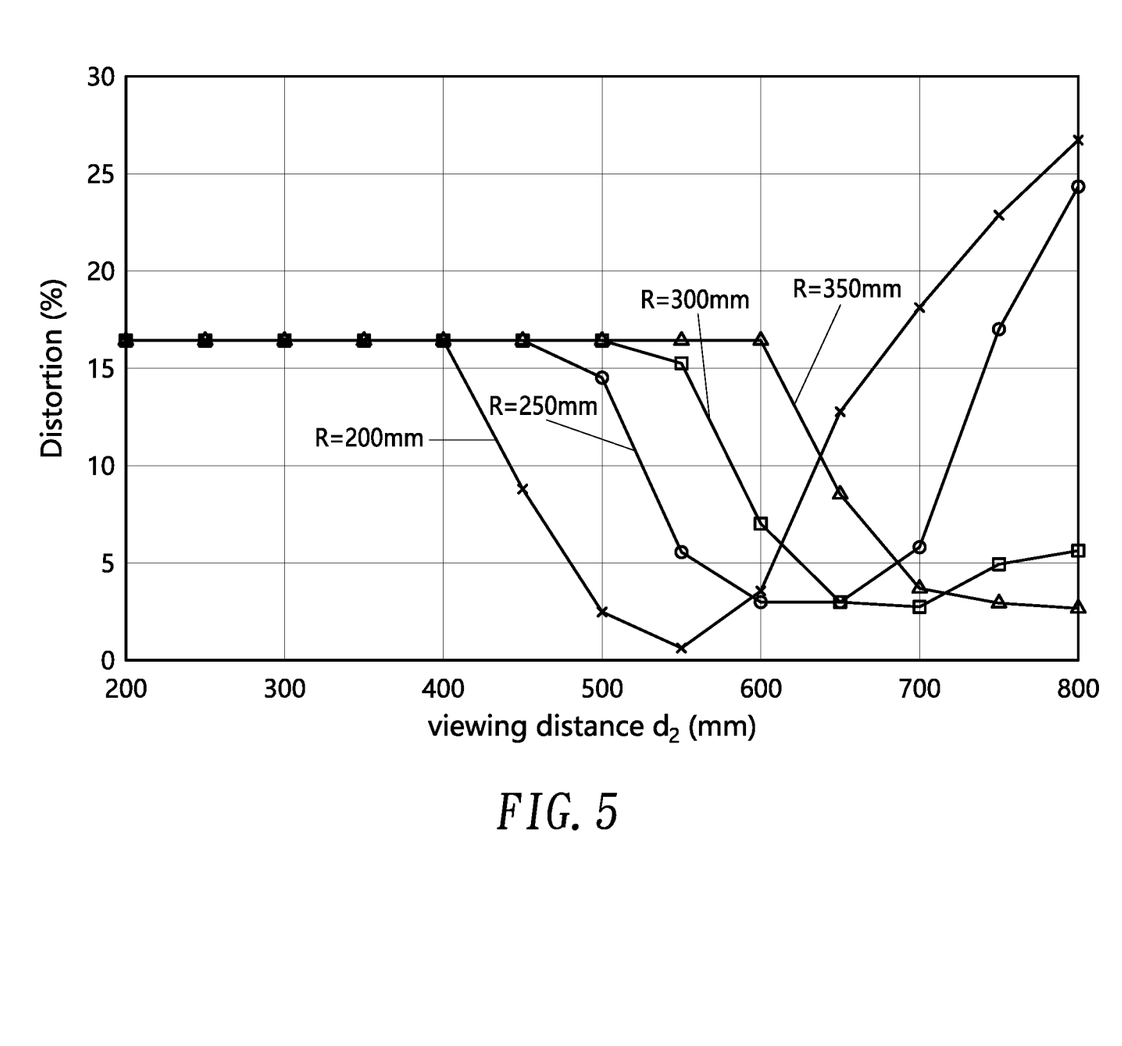
FIG. 5 shows relationship between the distortion and the viewing distance $d_2$ at different screen curvature R of the convex diffusion screen.

FIG. 5 shows relationship between the distortion and the viewing distance $d_2$ at different screen curvature R of the convex diffusion screen 13. We observe that the trend curve of R=200 mm is better than that of other curvatures, and that the image distortion is minimized at 550 mm of viewing distance $d_2$.

Figure 6:
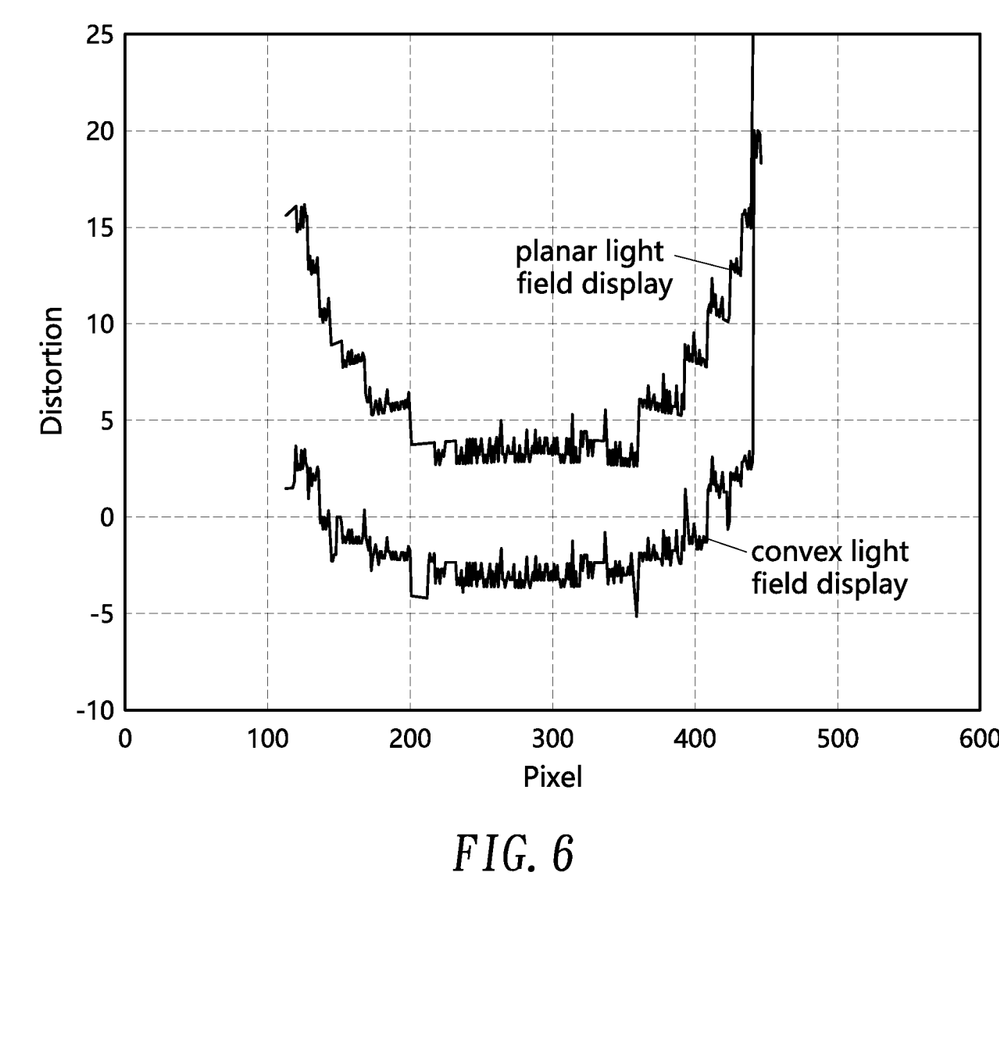
FIG. 6 shows image distortion along the horizontal direction of an image for the convex multi-projector light-field display system of the embodiment and a planar light-field display.

FIG. 6 shows image distortion along the horizontal direction of an image for the convex multi-projector light-field display system 100 of the embodiment and a planar light-field display. It is observed that the image quality of the convex multi-projector light-field display system 100 of the embodiment is substantially better than that of the planar light-field display.

In one embodiment, the display system 100 (FIG. 1 and FIG. 2) may include at least one delimiter 15 configured to mark a boundary of the second circle 14 representing an optimal viewing area with minimum image distortion, for example, by a laser projector that projects changing laser beams corresponding to the second circle 14. In general, the second radius r of the second circle 14 may be adjusted according to the first radius, the minimum viewing distance α and the projection angle ω.

In another embodiment, the display system 100 (FIG. 2) may include at least one calibrator 16, such as a camera, configured to calibrate the projectors 11 and the convex diffusion screen 13. The calibrator 16 may be disposed within or at the center of the second circle 14.

Although specific embodiments have been illustrated and described, it will be appreciated by those skilled in the art that various modifications may be made without departing from the scope of the present invention, which is intended to be limited solely by the appended claims.

What is claimed is:
1. A convex multi-projector light-field display system, comprising:
a plurality of projectors disposed approximately on a periphery of a first circle with first radius; and
a convex diffusion screen disposed approximately on the periphery of the first circle and facing the plurality of projectors;
wherein projections of the plurality of projectors overlap in a second circle with second radius as being an optimal viewing area, within which an observer sees images projected by the plurality of projectors, and the second circle and the first circle are disposed on opposite sides of the convex diffusion screen;
wherein the wider the convex diffusion screen is, the larger a minimum viewing distance between the first circle and the second circle is;
wherein relationship among the first radius R, the second radius r, a projection angle ω of the projector and the minimum viewing distance α is expressed as

$$r = \frac{(2R + \alpha)}{\left(1 - \sin\frac{\omega}{2}\right)} * \sin\frac{\omega}{2}.$$

2. The system of claim 1, wherein the projector comprises a microelectromechanical systems laser projector.
3. The system of claim 1, wherein the projectors emit light that is scattered by the convex diffusion screen, thereby projecting an entire three-dimensional image by superimposing sub-scenes corresponding to the projectors respectively.
4. The system of claim 1, wherein the convex diffusion screen has a width large enough to cover light projected from the plurality of projectors.
5. The system of claim 1, further comprising at least one delimiter that marks a boundary of the second circle representing the optimal viewing area.
6. The system of claim 5, wherein the delimiter comprises a laser projector that projects changing laser beams corresponding to the second circle.
7. The system of claim 1, further comprising at least one calibrator disposed within the second circle and used to calibrate the projectors and the convex diffusion screen.
8. The system of claim 7, wherein the calibrator comprises a camera.
9. A convex multi-projector light-field display system, comprising:
a plurality of projectors; and
a convex diffusion screen facing the plurality of projectors, the convex diffusion screen and the plurality of projectors sharing a same center of curvature, such that each said projector projects image at normal incidence to the convex diffusion screen;
wherein projections of the plurality of projectors overlap in a second circle as being an optimal viewing area, within which an observer sees images projected by the plurality of projectors, and the optimal viewing area and the plurality of projectors are disposed on opposite sides of the convex diffusion screen;
wherein the system further comprises at least one calibrator disposed within the second circle and used to calibrate the projectors and the convex diffusion screen.
10. The system of claim 9, wherein plurality of projectors and the convex diffusion screen are disposed approximately on a periphery of a first circle with first radius of 200 mm.
11. The system of claim 10, wherein a minimum viewing distance between the convex diffusion screen and the observer is about 200 mm.
12. The system of claim 11, wherein a viewing distance between the convex diffusion screen and the observer is in a range between 200 mm and 778 mm.
13. The system of claim 12, wherein an optimal viewing distance between the convex diffusion screen and the observer is about 550 mm.
14. The system of claim 13, wherein the optimal viewing area comprises the second circle with second radius of 289 mm.

15. The system of claim 9, wherein a projection angle of the projector is about 43°.

16. The system of claim 9, wherein light from each said projector is scattered by the convex diffusion screen at a scattering angle of about 5°.

17. The system of claim 9, further comprising at least one delimiter that marks a boundary of the optimal viewing area.

\* \* \* \* \*